United States Patent
Adams et al.

(10) Patent No.: US 8,814,270 B2
(45) Date of Patent: Aug. 26, 2014

(54) FOLDING HEADREST CLOSEOUT MEMBER

(75) Inventors: Grant Adams, Plymouth, MI (US);
Randy Eschelbach, Canton, MI (US);
Jason Gray, Commerce Township, MI (US); Dale Jung, Novi, MI (US);
Anthony Spagnuolo, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 132 days.

(21) Appl. No.: 13/524,860

(22) Filed: Jun. 15, 2012

(65) Prior Publication Data

US 2013/0334860 A1  Dec. 19, 2013

(51) Int. Cl.
*A47C 1/10* (2006.01)
(52) U.S. Cl.
USPC .......................................................... 297/408
(58) Field of Classification Search
USPC .............................. 297/410, 408, 396, 216.12
See application file for complete search history.

(56) References Cited

U.S. PATENT DOCUMENTS

| | | | |
|---|---|---|---|
| 3,586,366 A | 6/1971 | Patrick | |
| 4,711,494 A | 12/1987 | Duvenkamp | |
| 5,681,079 A * | 10/1997 | Robinson | 297/408 |
| 5,826,942 A * | 10/1998 | Sutton et al. | 297/403 |
| 6,074,010 A * | 6/2000 | Takeda | 297/408 |
| 6,508,512 B2 * | 1/2003 | Saberan et al. | 297/408 |
| 6,902,232 B2 | 6/2005 | Kamrath et al. | |
| 6,908,137 B2 | 6/2005 | Doxey et al. | |
| 7,108,323 B2 | 9/2006 | Welch et al. | |
| 7,201,437 B2 | 4/2007 | Freijy | |
| 7,258,400 B2 * | 8/2007 | Yamada | 297/408 |
| 7,422,280 B2 * | 9/2008 | Brockman | 297/408 |
| 7,543,891 B2 | 6/2009 | Chung | |
| 7,559,608 B2 | 7/2009 | Miyahara et al. | |
| 7,819,481 B2 * | 10/2010 | Yasukawa et al. | 297/408 |
| 2005/0052065 A1 | 3/2005 | Rothstein et al. | |
| 2007/0000973 A1 | 1/2007 | Johnson et al. | |
| 2007/0132299 A1 * | 6/2007 | De La Pradilla et al. | 297/408 |
| 2010/0019559 A1 * | 1/2010 | Smith | 297/408 |
| 2011/0084534 A1 * | 4/2011 | Sohn | 297/408 |
| 2011/0095592 A1 * | 4/2011 | Willard et al. | 297/408 |
| 2011/0101762 A1 * | 5/2011 | Lutzka et al. | 297/408 |
| 2013/0134761 A1 * | 5/2013 | Willard et al. | 297/408 |

FOREIGN PATENT DOCUMENTS

| | | |
|---|---|---|
| DE | 299 08 893 | 9/2000 |
| JP | 2010023819 | 2/2010 |
| WO | 2006074080 | 7/2006 |

OTHER PUBLICATIONS

Middleville Tool and Die Co., Inc. Brochure, date unknown.

* cited by examiner

*Primary Examiner* — Jose V Chen
(74) *Attorney, Agent, or Firm* — Young, Basile, Hanlon & MacFarlane, P.C.

(57) ABSTRACT

Folding assemblies for vehicles are described. In one aspect, a folding headrest assembly for a vehicle seat comprises a headrest having a frame. A pivot joint is coupled to the frame for rotatably supporting the headrest with respect to the vehicle seat between an upright position and a folded position. A support rod extends from the pivot joint and is configured for coupling to the vehicle seat. The headrest receives the pivot joint and a portion of the support rod, and the headrest defines an opening configured to provide clearance for the support rod as the headrest is rotated about the pivot joint relative to the support rod. A closeout member coupled to the support rod circumscribes at least an exposed portion of the pivot joint that is aligned with the opening of the headrest.

20 Claims, 8 Drawing Sheets

FOLDING HEADREST CLOSEOUT MEMBER

TECHNICAL FIELD

The embodiments disclosed herein generally relate to folding headrest assemblies for vehicle seats.

BACKGROUND

Vehicle seats installed in vehicles often include a variety of adjustment mechanisms that allow the position of the entire vehicle seat to be adjusted and the positions of the constituent portions of the vehicle seat to be adjusted with respect to one another. These adjustments allow for a wide variety of driver body types to be comfortably accommodated by the vehicle seat. The adjustments also can be utilized to improve ingress and egress with respect to the vehicle, as well as to move or stow the vehicle seat to provide additional cargo room for the vehicle.

For example, some rear vehicle seats in vehicles such as SUVs, crossovers, and minivans fold, stow into the floor, and/or pivot about a floor attachment point in order to increase the cargo carrying capability of the vehicle. In order to maximize cargo space, such cargo carrying configurations typically provide little space between the adjusted vehicle seat and other adjacent vehicle seats or trim surfaces within the vehicle. This makes it difficult to make geometric changes to the design of the vehicle. In particular, if a vehicle designer wishes to increase the size of a seating surface to increase comfort or support, this must be done without disturbing or eliminating the adjustment functionality of the vehicle seat.

The position and geometry of a typical headrest is such that folding a vehicle seat into a cargo carrying configuration may result in interference between the headrest and an adjacent vehicle seat. For this reason, headrests often include a folding mechanism that permits the headrest to move or pivot away from the main body of the vehicle seat, such that the headrest does not interfere with adjacent vehicle seats or trim surfaces when the vehicle seat is in a cargo carrying configuration. Such folding mechanisms can necessitate openings at the surface of the headrest to provide clearance for the folding mechanism as the headrest is moved or pivoted away from the main body of the vehicle seat.

SUMMARY

Disclosed herein are embodiments of folding assemblies for vehicles. In one aspect, a folding headrest assembly for a vehicle seat comprises a headrest having a frame. A pivot joint is coupled to the frame for rotatably supporting the headrest with respect to the vehicle seat between an upright position and a folded position. A support rod extends from the pivot joint and is configured for coupling to the vehicle seat. The headrest receives the pivot joint and a portion of the support rod, and the headrest defines an opening configured to provide clearance for the support rod as the headrest is rotated about the pivot joint relative to the support rod. A closeout member coupled to the support rod circumscribes at least an exposed portion of the pivot joint that is aligned with the opening of the headrest.

In another aspect, a vehicle seat comprises a seat back having a seating surface and a headrest having a frame. A pivot joint is coupled to the frame for rotatably supporting the headrest atop the seat back from an upright position, wherein a bottom surface of the headrest is adjacent the seat back and front surface of the headrest is substantially aligned with the seating surface, to a folded position, wherein the headrest is rotated forward with respect to the seat back. A support rod extends from the pivot joint and is coupled to the seat back. The headrest receives the pivot joint and a portion of the support rod, the headrest defines an opening having a front portion defined by the front surface of the headrest and a bottom portion defined by the bottom surface of the headrest and in communication with the front portion, and the opening is configured to provide clearance for the support rod as the headrest is rotated about the pivot joint from the upright position to the folded position. A closeout member coupled to the support rod circumscribes at least an exposed portion of the pivot joint that is aligned with the opening of the headrest.

In yet another aspect, a folding assembly for a vehicle interior comprises a first interior vehicle member rotatably coupled to a second interior vehicle member by a pivot joint received by the first interior vehicle member. A support rod extends from the pivot joint and is coupled to the second interior vehicle member. The first interior vehicle member further receives a portion of the support rod, and the first interior vehicle member defines an opening configured to provide clearance for the support rod as the first interior vehicle member is rotated relative to the second interior vehicle member. A flexible elongate strip coupled to the support rod forms a loop circumscribing at least an exposed portion of the pivot joint that is aligned with the opening of the first interior vehicle member.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are embodiments of folding assemblies for vehicles, such as a folding headrest assembly for a vehicle seat. According to one exemplary aspect, a folding headrest assembly includes novel features for obstructing portions a folding mechanism housed within the headrest from view through an opening defined by the headrest. These features can advantageously improve a user's perceived quality of the vehicle in which the vehicle seat is installed.

Figure 1:
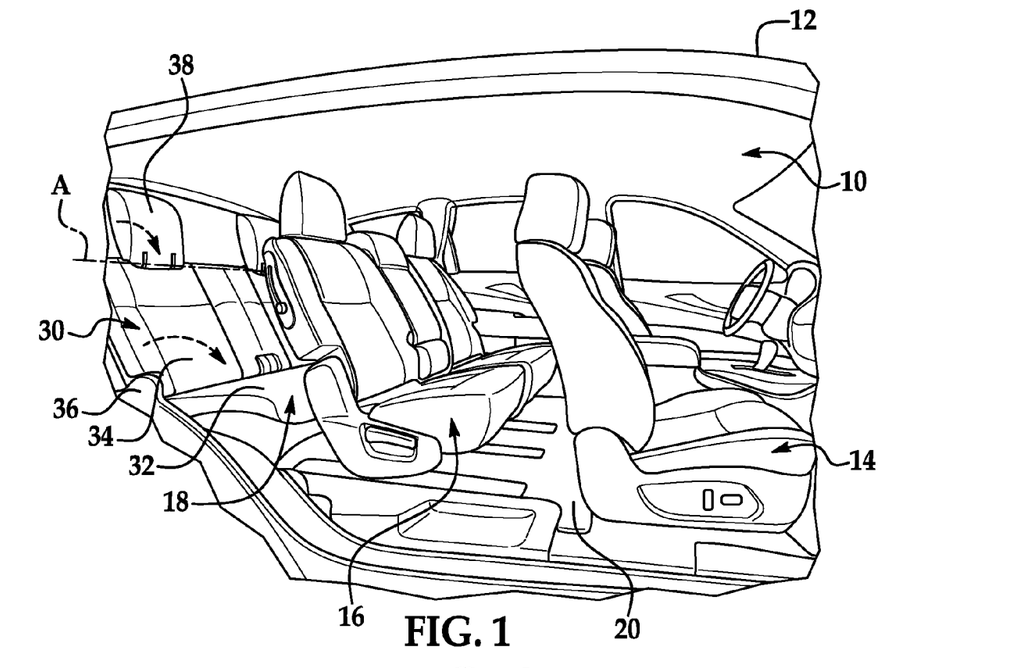
FIG. 1 is a side view of a vehicle interior showing vehicle seats disposed in a passenger carrying configuration.

FIG. 1 shows the passenger compartment 10 of a vehicle 12. The passenger compartment 10 includes a number of vehicle seats arranged in an exemplary seating configuration. As illustrated, the passenger compartment 10 has a pair of front row vehicle seats 14, a second row seating assembly 16 and a third row seating assembly 18, which are all supported with respect to a vehicle floor 20 of the vehicle 12.

The second row seating assembly 16 and the third row seating assembly 18 each include a plurality of individually moveable vehicle seats. The description that follows refers as a non-limiting example to the movement of a single vehicle seat 30 included in the third row seating assembly 18. However, those skilled in the art will understand that the advantageous features taught herein can be implemented in other vehicle seats of the passenger compartment 10. Further, these features can be implemented in any seat, whether or not in a vehicle, requiring repositioning of the headrest.

The vehicle seat 30 includes a base portion 32 disposed on the vehicle floor 20. A seat back 34 is coupled to the base portion 32 by a seat back pivot joint 36. The vehicle seat 30 further includes a headrest 38 coupled to the seat back 34. In the passenger carrying configuration, the seat back 34 of the vehicle seat 30 extends upward from the base portion 32 at an angle that is suitable for supporting the back of a passenger. The headrest 38 extends from a top portion of the seat back 34 in substantial alignment with the seat back 34 in an upright position suitable for supporting the head of a passenger.

Figure 2:
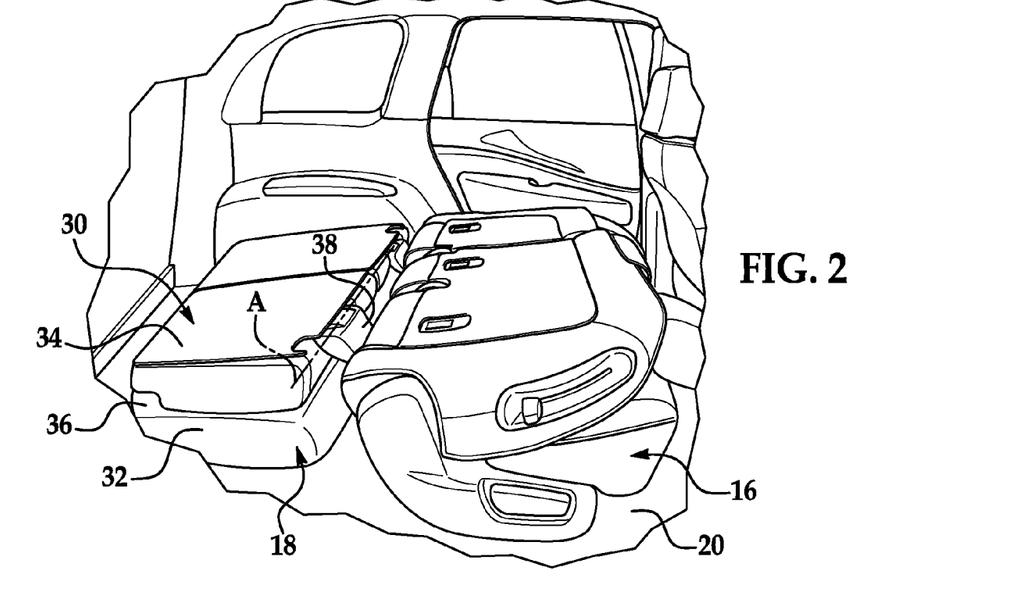
FIG. 2 is a side view of the vehicle interior showing the vehicle seats disposed in a cargo carrying configuration.

The vehicle seat 30 is shown in FIG. 1 disposed in a passenger carrying configuration, but the vehicle seat 30 is also moveable from the passenger carrying configuration shown in FIG. 1 to a cargo carrying configuration, as shown in FIG. 2. The seat back pivot joint 36 allows the seat back 34 of the vehicle seat 30 to pivot forward with respect to the base portion 32 about an axis extending transverse to the vehicle seat 30. Similarly, the headrest 38 is coupled to the seat back 34 such that it is capable of pivoting with respect to the seat back 34 about a headrest axis A extending along the vehicle seat back 34 in a lateral vehicle direction.

In the cargo carrying configuration, the seat back 34 is pivoted forward about the seat back pivot joint 36. The movement of the seat back 34 disposes the seat back 34 adjacent to and substantially flat against the base portion 32. Further, the headrest 38 is pivoted forward about the headrest axis A to prevent interference between the headrest 38 and the second row seating assembly 16 as the seat back 34 is pivoted forward. As a result of the forward pivoting of the headrest 38 with respect to the seat back 34 about the headrest axis A, the headrest 38 is vertically disposed and positioned adjacent to or in contact with the second row seating assembly 16.

Figure 3:
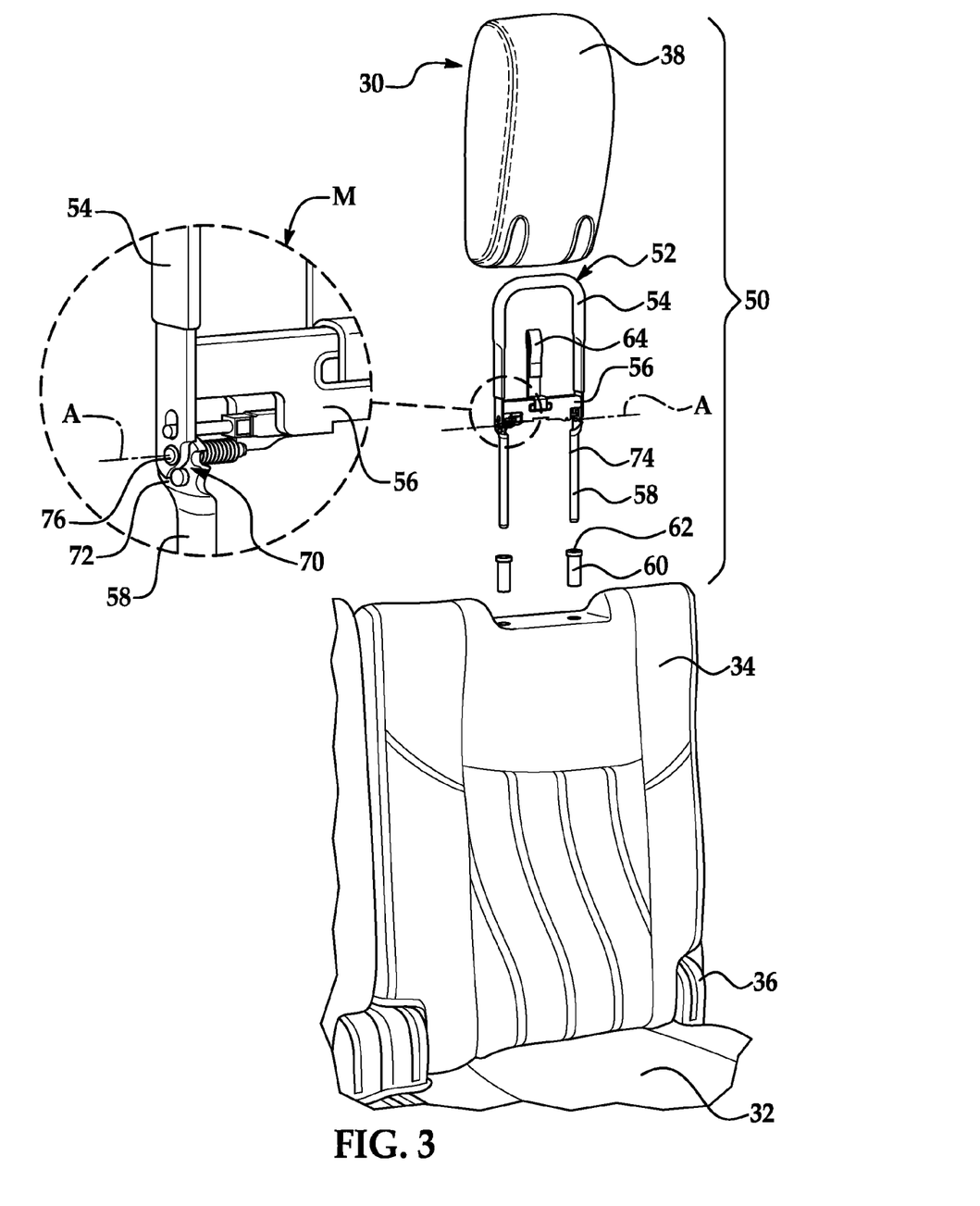
FIG. 3 is a perspective exploded view of a vehicle seat showing a folding headrest assembly for the vehicle seat.

FIG. 3 is an assembly view showing components of the vehicle seat 30, including the base portion 32, the seat back 34, which is coupled to the base portion 32 by the seat back pivot joint 36, and the headrest 38. As shown in FIG. 3, the headrest 38 is included in a folding headrest assembly 50 having a folding mechanism 52. The folding mechanism 52 is configured to couple the headrest 38 to the seat back 34 and to permit pivoting of the headrest 38 with respect to the seat back 34 about the headrest axis A. The folding mechanism 52 includes a headrest frame 54 that supports the headrest 38, a base portion 56 that is rigidly connected to the headrest frame 54, and a pair of support rods 58, which are pivotally coupled to the base portion 56 and the headrest frame 54, as explained below, and which extend towards the seat back 34 for coupling thereto. The folding headrest assembly 50 further includes a pair of tubular rod holders 60. The rod holders 60 can be fixed within the seat back 34 and define apertures 62, into which the support rods 58 are releasably receivable for securing the support rods 58 with respect to the seat back 34. The rod holders 60 can optionally be configured to also permit sliding vertical adjustment of the support rods 58 and folding mechanism 52 with respect to the seat back 34.

The folding mechanism 52 can include features for selectively locking and releasing the support rods 58 for pivoting with respect to the base portion 56. The illustrated folding mechanism 52 can be operated by a release strap 64. When the release strap 64 is pulled to a release position, the folding mechanism 52 is operated such that the support rods 58 are permitted to pivot with respect to the base portion 56 and the headrest frame 54. With the support rods 58 secured to the seat back 34, and with the headrest 38 supported on the headrest frame 54, the headrest 38 is pivoted with respect to the support rods 58 and with respect to the seat back 34 about the headrest axis A. By way of example, the folding mechanism 52 can include a release mechanism housed within the base portion 56, as described in U.S. application Ser. No. 12/968,445, which is incorporated herein by reference. However, other methods known to those skilled in the art can be used for selectively locking and releasing the support rods 58 for pivoting with respect to the body portion 56 and/or the headrest frame 54.

Further features of the folding mechanism 52 are explained below with additional reference to detail M of FIG. 3. The folding mechanism 52 of the folding headrest assembly 50 has a pair of pivot joints 70, which pivotally support the headrest 38 with respect to the seat back 34 in combination with the remainder of the folding mechanism 52. The pivot joints 70 are formed in part by support portions 72 of the support rods 58. As shown, a support portion 72 is pivotally connected to a rotation shaft 76 of the base portion 56 to form a pivot joint 70, although the support portion 72 could be otherwise connected to the base portion 56 or to the folding mechanism 52 to form the pivot joint 70. The illustrated rotation shaft 76 extends along the headrest axis A, and the support portions 72 of the support rods 58 can each define rotation apertures (not shown) for receiving a rotation shaft 76. The support portions 72 and their rotation apertures are oriented perpendicularly to a rotation shaft 76 such that the support rods 58 are configured to pivot about the headrest axis A. Further details of an exemplary support rod and pivot joint are described in U.S. application Ser. No. 12/968,445, which is incorporated herein by reference. However, any pivot joint known to those skilled in the art, in or without combination with the illustrated base portion 56 and headrest frame 54, could alternatively be used for supporting the headrest 38 with respect to the seat back 34.

Figure 4:
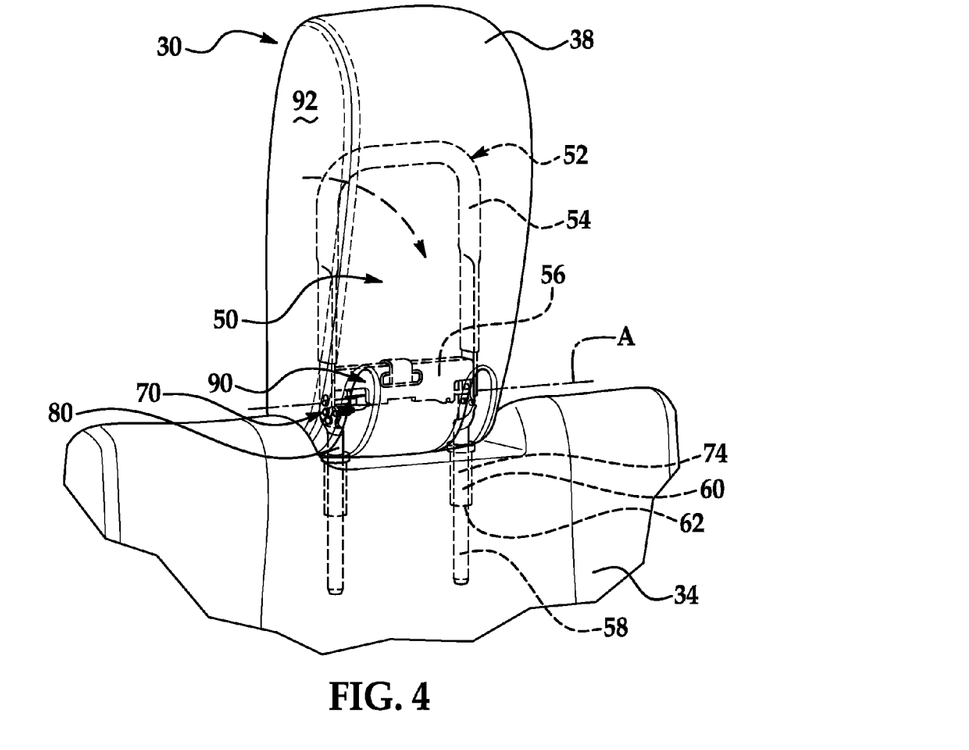
FIG. 4 is a detailed perspective view of the vehicle seat and folding headrest assembly showing the headrest oriented in an upright position.

The assembled folding headrest assembly 50 is shown in FIG. 4 installed to the seat back 34. The support rods 58 generally have shaft portions 74 extending from pivot joints 70 opposite the support portions 72. The shaft portions 74 of the support rods 58 extend downward from the pivot joints 70 and are inserted into the rod holders 60 to secure the support rods 58 with respect to the seat back 34. With the shaft portions 74 of support rods 58 securely inserted into the rod holders 60 of the seat back 34, the support portions 72 and pivot joints 70 are fixed with respect to the seat back 34. The pivot joints 70 pivotally support the base portion 56 and the headrest frame 54 for rotation about the headrest axis A. The headrest 38 defines a headrest cavity (not shown) for receiving the headrest frame 54, such that the pivot joints 70 also pivotally support the headrest 38 for rotation about the headrest axis A.

The illustrated pivot joints 70 are positioned with respect to the seat back 34 adjacent a top portion of the seat back 34, such that the headrest axis A extends transverse to the seat back 34 at a position spaced from the top portion of the seat back 34. The pivot joints 70 are configured with a single degree of freedom for single axis rotation about the headrest axis A. However, the illustrated pivot joints 70 are provided by way of a non-limiting example. The pivots joints 70 could be alternatively disposed with respect to the seat back 34, and other pivot joints known to those skilled in the art with alternative and/or additional degrees of freedom can be used in place of the illustrated pivot joint 70.

Figure 5:
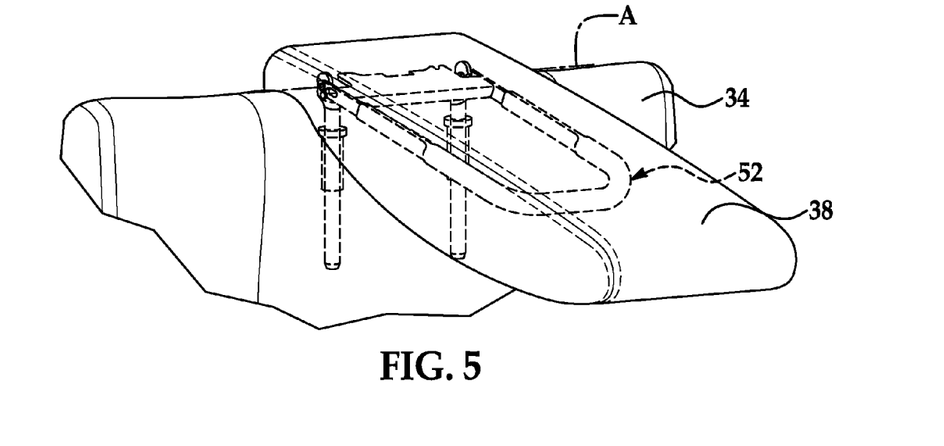
FIG. 5 is a detailed perspective view of the vehicle seat and folding headrest assembly showing the headrest oriented in a folded position.

The folding mechanism 52 having the pivot joints 70 is configured to pivotally support the headrest 38 with respect to the seat back 34 for rotation between at least an upright position and a folded position. The headrest 38 is shown in FIG. 4 oriented in an upright position, where the headrest 38 extends from the top portion of the seat back 34 in substantial alignment with the seat back 34. The headrest 38 is shown in FIG. 5 (with certain reference numerals omitted for clarity) oriented in a folded position, where the headrest 38 extends from the top portion of the seat back 34 out of alignment with the seat back 34. In the folded position, the headrest 38 is oriented approximately 90 degrees forward from the upright position. By orienting the headrest 38 in the folded position, interference can be prevented between the headrest 38 and the second row seating assembly 16 when the seat back 34 is pivoted forward about the seat back pivot joint 36 to dispose the vehicle seat 30 in the cargo carrying configuration.

The headrest 38 is configured to house certain portions of folding mechanism 52, while other portions of the folding mechanism 52 are disposed in a space exterior to the headrest 38. The headrest frame 54 is seated within a cavity (not shown) defined by the headrest 38, and the headrest 38 further receives the base portion 56 and the pivot joints 70. Additionally, the support rods 58 are partially disposed within the headrest 38. The support portions 72 of the support rods 58 form portions of the pivot joints, and an intermediate segment 80 of the shaft portions 74 of the support rods 58 immediately adjacent to the support portions 72 is also housed within the headrest 38. The shaft portions 74 of the support rods 58 further extend towards the seat back 34 and ultimately to a space exterior to the headrest 38.

The headrest 38 can include features for providing clearance for the support rods 58 as the headrest 38 is rotated about the pivot joints 70 relative to the support rods 58. The illustrated headrest 38 defines a pair of openings 90. The openings 90 are generally configured as recesses that extend from an interior of the headrest 38 to an outer surface 92 of the headrest 38. For example, an opening 90 can originate contiguously with the internal cavity defined by the headrest 38 for housing the pivot joint 70 at a position adjacent to the pivot joint 70, and extend outward from the cavity to the outer surface 92 of the headrest 38.

The configuration of the openings 90 is related to the arrangement and operation of the folding mechanism 52 with respect to the headrest 38. In general, the openings 90 are defined by a geometric intersection of a support rod 58 and the headrest 38 as the support rod 58 pivots about a pivot joint 70 from which the support rod 58 extends. The description of the openings 90 is simplified herein for clarity. It will be understood by those skilled in the art that the configuration of the openings 90 can vary from the illustrated exemplary openings 90 depending upon, for example, the size, shape and/or construction of the pivot joints 70, the support rods 58 and the headrest 38.

For the illustrated headrest 38, an outer periphery 94 for each opening 90 is defined at the outer surface 92 of the headrest 38. As indicated above, the outer peripheries 94 of the openings 90 are generally defined by geometric intersections of the support rods 58 and the outer surface 92 of the headrest 38 as the support rods 58 pivot about the pivot joints 70.

Figure 6:
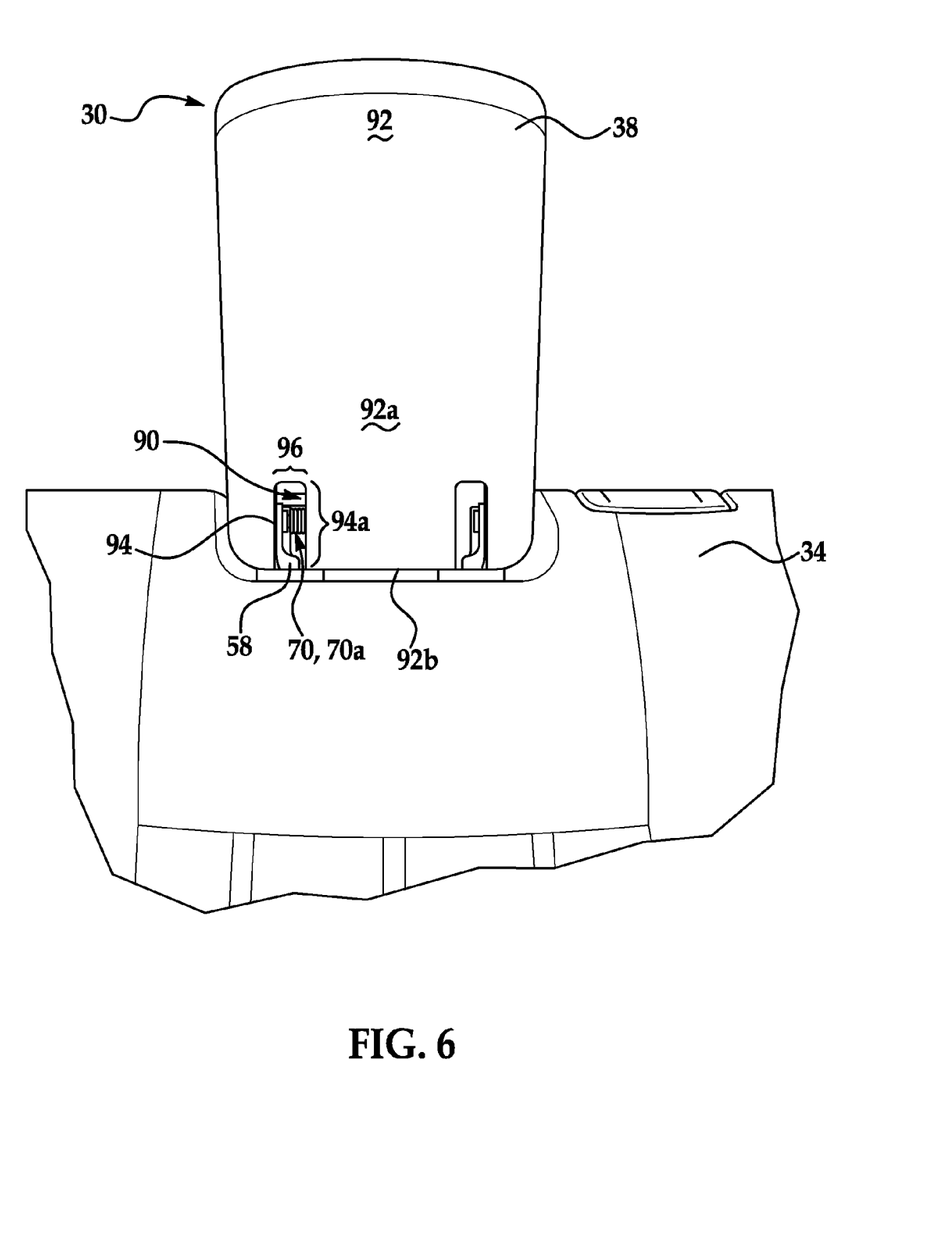
FIG. 6 is a front plan view of the vehicle seat showing a portion of pivot joint included in a folding mechanism exposed to view through an opening in the headrest while the headrest is oriented in the upright position.

As shown in FIG. 6, the support rods 58 extend from the pivot joints 70 through a bottom surface 92*b* of the outer surface 92 of the headrest 38 when the headrest 38 is oriented in the upright position. As the headrest 38 rotates forward about the headrest axis A to the folded position, the support rods 38 pivot relative to the headrest 38 about the pivot joints 70 until the support rods 38 extend from the pivot joints 70 through a front surface 92*a* of the outer surface 92 of the headrest 38, as shown in FIG. 7.

To provide clearance for the support rods 58 as the headrest 38 is rotated about the pivot joints 70 relative to the support rods 58, the illustrated openings 90 generally extend from the front surface 92*a* of the outer surface 92 of the headrest 38 to the bottom surface 92*b*. At the outer surface 92 of the headrest 38, the outer peripheries 94 of the openings 90 likewise extend from the front surface 92*a* of the outer surface 92 of the headrest 38 to the bottom surface 92*b*, such that the openings 90 have a front portion 94*a* and a bottom portion 94*b* at the outer surface 92 of the headrest 38. The outer peripheries 94 of the openings 90 can also have opening widths 96 generally corresponding to the diameter of the shaft portions 74 of the support rods 58.

The openings 90 form a window through which portions of the folding mechanism 52 can be viewed from a space exterior to the headrest 38. However, having portions of the folding mechanism 52 viewable through the openings can contribute to a lowered perception of quality of the vehicle 12 in which the vehicle seat 30 is installed.

Figure 7:
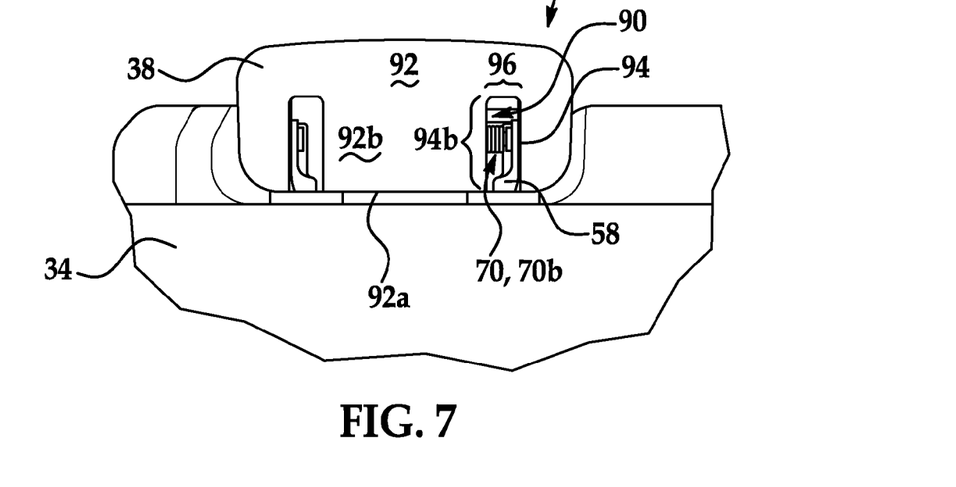
FIG. 7 is a rear plan view of the vehicle seat showing a portion of the pivot joint included in the folding mechanism exposed to view through the opening in the headrest while the headrest is oriented in the folded position.

As shown in FIGS. 6 and 7, the illustrated folding mechanism 52, headrest 38 and openings 90 of the headrest 38 are generally configured such that the openings 90 align with portions of the pivot joints 70, thereby exposing those portions of the pivot joints 70 to view from a space exterior to the headrest 38. Further, the illustrated openings 90 generally shift with respect to the pivot joints 70 as the headrest 38 moves. Specifically, the openings 90 rotate circumferentially with respect to the pivot joints 70 as the headrest 38 rotates about the pivot joints 70 between the upright position and the folded position.

As the openings 90 rotate, the openings 90 align with different portions of the pivot joints 70, exposing such portions to view from a space exterior to the headrest 38. For the illustrated folding mechanism 52, headrest 38 and openings 90, the openings 90 rotate to expose multiple radially outer sides of the pivot joints 70 as the headrest 38 defining the openings 90 is rotated about the pivot joints 70. When the headrest 38 is oriented in the upright position, first outer sides 70a of the pivot joints 70 are exposed through the openings 90. Rotation of the headrest 38 to the folded position, however, exposes second outer sides 70b of the pivot joints 70 through the openings 90. As shown, the first outer sides 70a are forward facing radially outer sides of the pivot joints 70, while the second outer sides 70b are rear facing radially outer sides of the pivot joints 70. Further, the first outer sides 70a and 70b are positioned on opposing sides of the support rods 58 extending from the pivot joints 70.

Figure 8:
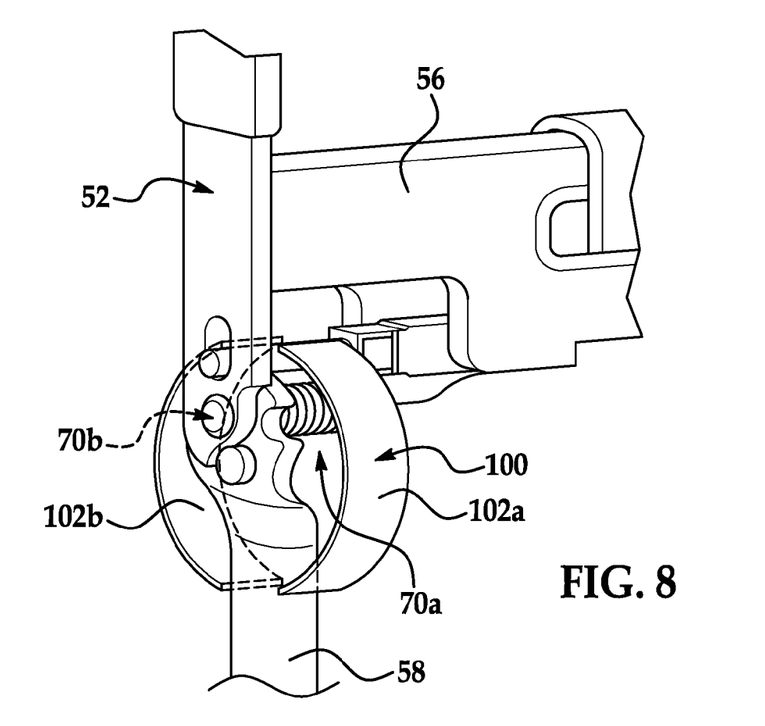
FIG. 8 is a perspective view of a closeout member disposed about the pivot joint of the folding mechanism.

According to FIG. 8, a closeout member 100 can be disposed about a pivot joint 70 to obstruct from view some or all of the portions of the pivot joint 70 otherwise exposed to view through the openings 90 of the headrest 38 from a space exterior to the headrest 38.

Figure 9:
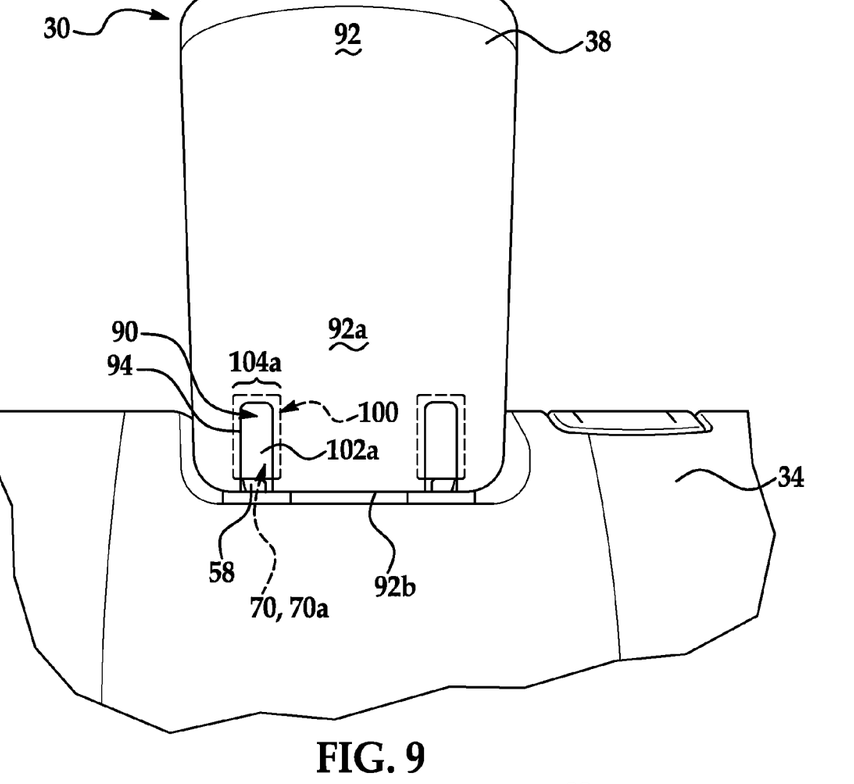
FIG. 9 is a front plan view of the vehicle seat showing the closeout member obstructing portions of the pivot joint from view through the opening in the headrest while the headrest is oriented in the upright position.

The exemplary closeout member 100 includes a first body portion 102a positioned with respect to the pivot joint 70 to circumscribe at least some of the first outer side 70a of the pivot joint 70. The first body portion 102a is generally positioned adjacent the first outer side 70a of the pivot joint 70. As shown in FIG. 9, the first body portion 102a obstructs the view of the first outer sides 70a of the pivot joints 70 that are otherwise exposed through the openings 90 when the headrest 38 is oriented in the upright position to align the openings 90 with the first outer sides 70a of the pivot joints 70.

Figure 10:
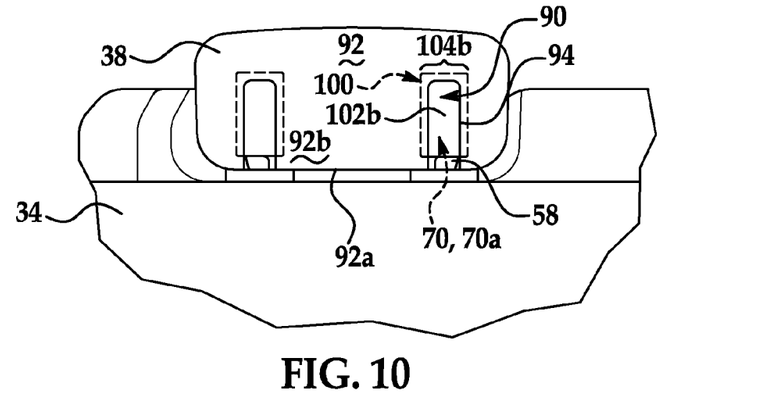
FIG. 10 is a rear plan view of the vehicle seat showing the closeout member obstructing portions of the pivot joint from view through the opening in the headrest while the headrest is oriented in the folded position.

The exemplary closeout member 100 can further include a second body portion 102b positioned with respect to the pivot joint 70 to circumscribe at least some of the second outer side 70b of the pivot joint 70. The second body portion 102b is generally positioned adjacent the second outer side 70b of the pivot joint 70. As shown in FIG. 10, the second body portion 102b obstructs the view of the second outer sides 70b of the pivot joints 70 that are otherwise exposed through the openings 90 when the headrest 38 is oriented in the folded position to align the openings 90 with the second outer sides 70b of the pivot joints 70.

The first body portion 102a and the second body portion 102b can have respective widths 104a and 104b. The widths 104a and 104b can generally correspond to the configuration of a pivot joint 70 about which the closeout member 100 is disposed. For example, the widths 104a and 104b can be substantially a width of the pivot joint 70, or, substantially a width of the portion of the pivot joint 70 exposed to view through the openings 90 of the headrest 38 from a space exterior to the headrest 38.

The widths 104a and 104b can similarly correspond to the configuration of the openings 90. For example, the widths 104a and 104b can be greater than a minimal width of the openings 90. It will be understood by those skilled in the art that a minimal width of the openings 90 may not correspond to the opening widths 96 (shown in FIGS. 6 and 7) of the openings 90. The illustrated openings 90 are simplified to only show opening widths 96 at the outer peripheries 94 of the openings 90. The opening widths 96 are shown as substantially constant along the outer surface 92 of the headrest 38. However, the widths of the openings 90 can be configured to decreasingly taper in a depth direction of the openings 90 as the openings 90 extend from the outer surface 92 of the headrest 38 towards an interior of the headrest 38. Thus, it will be understood that the first body portion 102a and the second body portion 102b are capable of having respective widths 104a and 104b generally greater than a minimal width of the openings 90, while also being generally smaller than the illustrated opening widths 96 of the openings 90.

Although the respective widths 104a and 104b of the first body portion 102a and the second body portion 102b are illustrated as substantially constant, the widths 104a and 104b could, for example, vary in correspondence with a varying width of the openings 90. The widths 104a and 104b can further account for the circumferential rotation of the openings 90 with respect to the pivot joints as the headrest 38 rotates about the pivot joints 70. The closeout member 100 can be configured to statically fix the first body portion 102a and the second body portion 102b with respect to a pivot joint 70. However, the openings 90 rotate circumferentially with respect to the pivot joints 70 as the headrest 38 rotates about the pivot joints 70 between the upright position and the folded position. The closeout member 100 can therefore be configured such that the first body portion 102a and the second body portion 102b have respective widths 104a and 104b that effectively obstruct the view of the first and second outer sides 70a and 70b of the pivot joints 70, respectively, through all portions of the openings 90 through which the first and second outer sides 70a and 70b of the pivot joints 70 can be viewed as the headrest 38 rotates about the pivot joints 70 between the upright position and the folded position.

As indicated in FIGS. 9 and 10, the closeout member 100 can be generally located internally with respect to the outer surface 92 of the headrest 38. Thus, the illustrated closeout member 100 is positioned about a pivot joint 70 such that one or both of the first body portion 102a and the second body portion 102b are placed between the pivot joint 70 and an outer periphery 94 of an opening 90 of the headrest 38 that provides clearance for a support rod 58 extending from the pivot joint 70. The first and second body portions 102a and 102b could, for example, be positioned directly adjacent the pivot joint 70 within the cavity defined by the headrest 38 for housing the pivot joint 70, and/or could be positioned at any point within the opening 90 defined by the headrest 38.

The exemplary closeout member 100 can be disposed about a pivot joint 70 as described above via coupling to one or more components of the headrest assembly 50. The closeout members described below can be implemented via coupling to portions of the folding mechanism 52.

Figure 11:
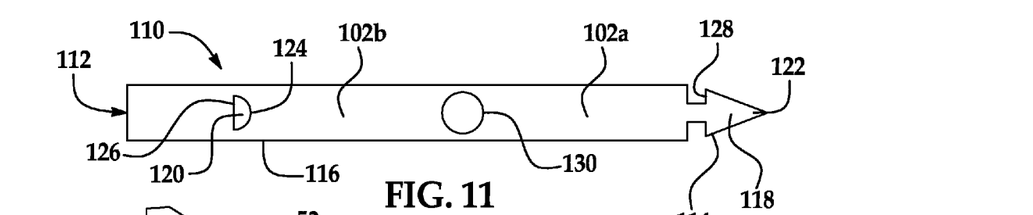
FIG. 11 is a plan view of an embodiment of a closeout member configured to form a loop around the pivot joint.

The closeout member 110 shown in FIG. 11 includes the first body portion 102a and the second body portion 102b disposed on an elongate strip 112. The elongate strip 112 is composed of a flexible material suitable for bending, such that the elongate strip 112 can be configured to form a loop around the pivot joint 70. The elongate strip 112 can be composed of polyolefin, for example, or of other suitable materials known to those skilled in the art.

As explained below, the spatial relationships between the constituent features of the elongate strip 112 are such that the first body portion 102a and the second body portion 102b are positioned to circumscribe at least some of the first outer side 70a and the second outer side 70b of the pivot joint 70, respectively, when the elongate strip 112 is disposed in a loop around the pivot joint 70.

In addition to being flexible to form a loop around the pivot joint 70, the elongate strip 112 includes features for retaining the elongate strip 112 in a looped fashion about the pivot joint 70. As shown, the elongate strip 112 includes a notched portion 114 disposed at one terminal end of the elongate strip 112, and includes a notch receiving portion 116 disposed adjacent an opposing terminal end of the elongate strip 112. The notched portion 114 generally includes a notch 118, and the notch receiving portion 116 correspondingly includes features for receiving the notch 118. With the notch 118 received within the notch receiving portion 116, the elongate strip 112 can be configured as a loop.

The notch receiving portion 116 defines an aperture 120 configured to receive the notch 118. The illustrated notch 118 terminates at a pointed portion 122, which allows easy alignment with an insertion into the aperture 120. The aperture 120 is shaped as a half circle and oriented on the elongate strip 112 with respect to the notch 114 such that the pointed portion 122 faces a curved edge 124 defined by the aperture 120 as the notch 118 enters the aperture 120. The aperture 120 defines a flat edge 126 opposite the curved edge 124. When the notch 118 is received in the aperture 120, a flat shoulder 128 of the notch 118 opposite the pointed portion 122 engages material of the elongate strip 112 surrounding the flat edge 126 of the aperture 120 to retain the notch 118 within the aperture 120, thereby retaining the elongate strip 112 in a looped fashion.

Figures 12A, 12B:
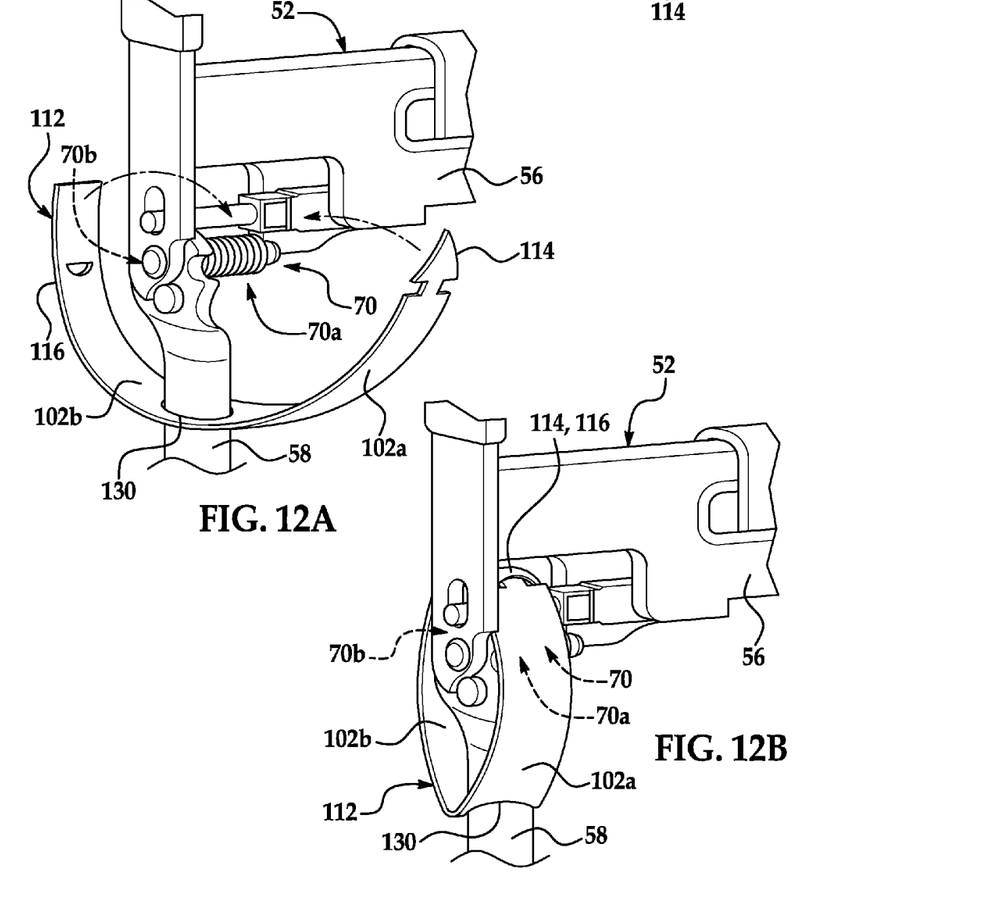
FIGS. 12A and 12B are perspective views of the pivot joint showing installation of the closeout member of FIG. 11 about the pivot joint.

The elongate strip 112 additionally includes features for coupling the closeout member 110 about a pivot joint 70. The elongate strip 112 defines an attachment aperture 130, which is disposed along the elongate strip 112 at a position between the notched portion 114 and the notch receiving portion 116. As shown in FIG. 12A, the attachment aperture 130 is sized to receive the support rod 58 extending from the pivot joint 70. With the support rod 58 received within the attachment aperture 130, the elongate strip 112 is arranged for coupling to the pivot joint 70 when the notch 118 is received within the notch receiving portion 116 to configure the elongate strip 112 as a loop.

As shown in FIG. 12B, with the support rod 58 received within the attachment aperture 130 and with the elongate strip 112 looped about the pivot joint 70, the elongate strip 112 is generally statically fixed with respect to the pivot joint 70. The loop formed by the elongate strip 112 carries the first and second body portion 102a, 102b in desired positions about the pivot joint 70. The respective locations of the first body portion 102a, the second body portion 102b, the attachment aperture 130, the notched portion 114 and the notch receiving portion 116 on the elongate strip 112 are such that the elongate strip 112 positions the first and second body portion 102a, 102b about the pivot joint 70 in alignment with an opening 90 of the headrest 38 supported by the pivot joint 70.

For the illustrated elongate strip 112, the notched portion 114 and the notch receiving portion 116 are disposed along the elongate strip 112 adjacent to peripheral areas of the first body portion 102a and the second body portion 102b, respectively, opposite the attachment aperture 130. When the elongate strip 112 is configured as a loop about the pivot joint 70, the first body portion 102a and the second body portion 102b are positioned to circumscribe at least some of the first outer side 70a and the second outer side 70b of the pivot joint 70, respectively. The notched portion 114 and the notch receiving portion 116 are generally positioned at an upper apex of the loop out of view from the opening 90 of the headrest 38.

Figure 13:
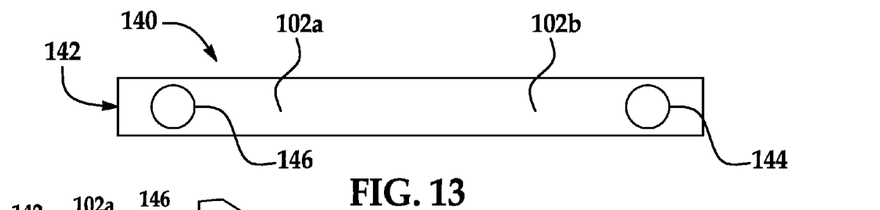
FIG. 13 is a plan view of another embodiment of a closeout member configured to form a loop around the pivot joint.

An alternative configuration of a closeout member is shown in FIG. 13. Similar to the closeout member 110, a closeout member 140 includes the first body portion 102a and the second body portion 102b disposed on a flexible elongate strip 142 that can be configured to form a loop around a pivot joint 70.

Figures 14A, 14B:
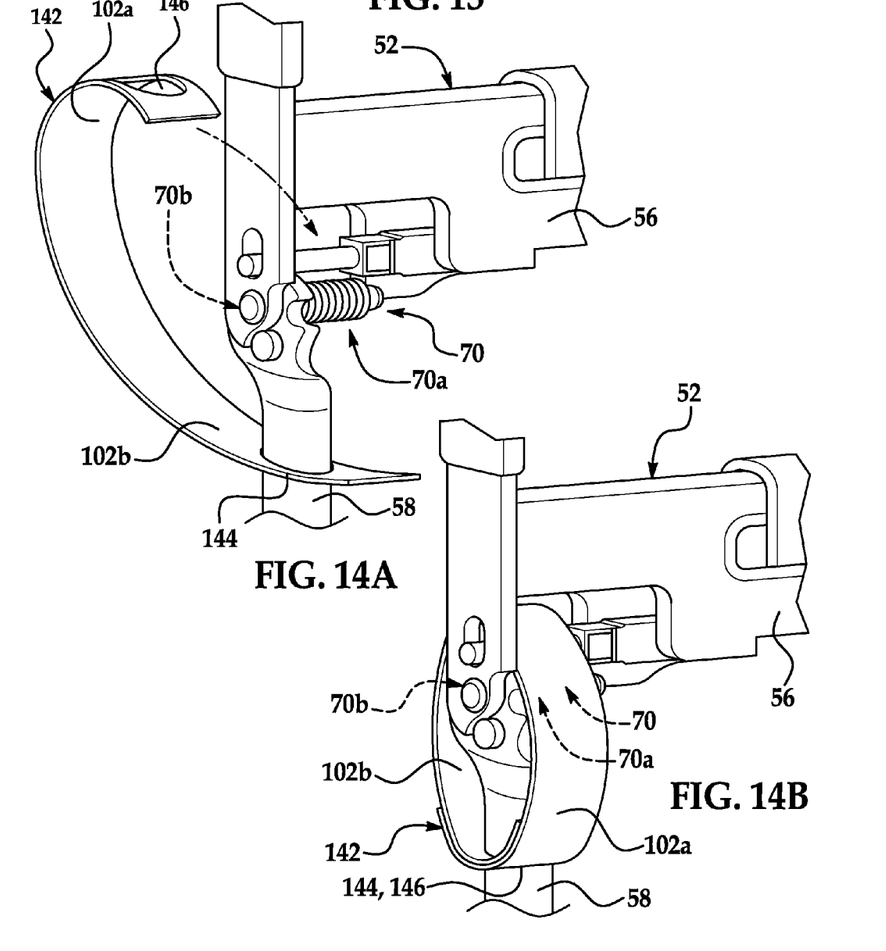
FIGS. 14A and 14B are perspective views of the pivot joint showing installation of the closeout member of FIG. 13 about the pivot joint.

As shown, the elongate strip 142 defines a pair of attachment apertures 144 and 146, disposed adjacent opposing terminal ends of the elongate strip 142. The attachment apertures 144, 146 are configured for coupling the closeout member 140 about a pivot joint 70. As shown in FIG. 14A, the attachment aperture 144 is sized to receive the support rod 58 extending from the pivot joint 70. With the support rod 58 received within the attachment aperture 144, the elongate strip 142 is arranged for coupling to the pivot joint 70.

The elongate strip 142 is configured to stretch such that when the support rod 58 is received within the attachment aperture 144, and when the second body portion 102b is positioned about the second outer side 70b of the pivot joint 70 to partially loop the elongate strip 142 about the pivot joint 70, the elongate strip 142 can stretch to allow the attachment aperture 146, which is also sized to receive the support rod 58, to reach a distal end of the support rod 58. With the distal end of the support rod 58 received within the attachment aperture 146, the elongate strip 142 withdraws to guide the aperture 146 along the support rod 58 towards the attachment aperture 144, such that the elongate strip 142 forms a loop about the pivot joint 70. Some or all of the elongate strip 142 can be composed of an elastomeric material, for example, or of other suitable materials known to those skilled in the art to permit the elongate strip 142 to stretch.

As shown in FIG. 14B, with the support rod 58 received within the attachment apertures 144 and 146, and with the elongate strip 142 looped about the pivot joint 70, the elongate strip 142 is generally statically fixed with respect to the pivot joint 70. The loop formed by the elongate strip 142 carries the first and second body portion 102a, 102b in desired positions about the pivot joint 70. The respective locations of the first body portion 102a, the second body portion 102b and the attachment apertures 144 and 146 on the elongate strip 142 are such that the elongate strip 142 positions the first and second body portions 102a, 102b about the pivot joint 70 in alignment with an opening 90 of the headrest 38 supported by the pivot joint 70.

For the illustrated elongate strip 142, the attachment apertures 144 and 146 are disposed adjacent opposing terminal ends of the elongate strip 142 that are adjacent to peripheral areas of the first body portion 102a and the second body portion 102b, respectively. When the elongate strip 142 is configured as a loop about the pivot joint 70, the first body portion 102a and the second body portion 102b are positioned to circumscribe at least some of the first outer side 70a and the second outer side 70b of the pivot joint 70, respectively.

Other variations of the exemplary closeout member 100 can be implemented such that the first body portion 102a and the second body portion 102b are positioned to circumscribe at least some of the first outer side 70a and the second outer side 70b of the pivot joint 70, respectively, as described above. For example, the first and second body portions 102a and 102b can be adhered, snap fit, friction fit or otherwise coupled to portions of the folding mechanism 52. In addition, a loop can be fashioned about a pivot joint 70 otherwise than as specifically described above to position the first and second body portions 102a, 102b about the pivot joint 70 in alignment with an opening 90 of the headrest 38 supported by the pivot joint 70. For instance, terminal ends of the first and second body portions 102a and 102b can be attached to each other, for example via adhesive or via a notch and notch receiving portion, to create and retain a loop can about the pivot joint 70.

The folding headrest assembly 50 is presented above as an exemplary environment in which the closeout members according to the described embodiments can be implemented. However, it will be appreciated by those skilled in the art that the closeout members can be otherwise implemented in the vehicle 12. For example, a closeout member could be used as described above to circumscribe a pivot joint included in other folding assemblies of the vehicle 12 similarly having a pivot joint received by a first vehicle member configure to rotatably couple the first vehicle member to a second vehicle member via the pivot joint and a support rod extending therefrom.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A folding headrest assembly for a vehicle seat, comprising:
   a headrest having a frame;
   a pivot joint coupled to the frame for rotatably supporting the headrest with respect to the vehicle seat between an upright position and a folded position;
   a support rod extending from the pivot joint and configured for coupling to the vehicle seat, wherein when the headrest is fitted on the frame, the pivot joint is positioned in an opening defined in the headrest such that the pivot joint has an exposed portion viewable through the opening, the opening configured to provide clearance for the support rod as the headrest is rotated about the pivot joint relative to the support rod to the folded position; and
   a closeout member circumscribing at least the exposed portion of the pivot joint, the closeout member having an attachment aperture through which the support rod extends to position the closeout member proximate the exposed portion of the pivot joint in the opening to obstruct view of the exposed portion of the pivot joint.

2. The folding headrest assembly of claim 1, wherein the closeout member is a flexible elongate material configured to fully circumscribe the pivot joint by forming a loop around the pivot joint when the support rod is extending through the attachment aperture.

3. The folding headrest assembly of claim 1, wherein the closeout member is an elongate strip comprising:
   a body portion configured to circumscribe the exposed portion of the pivot joint, with the attachment aperture positioned in the body portion;
   a notched portion; and
   a notch receiving portion, the notched portion and the notch receiving portion opposedly spaced from the attachment aperture and configured to create and retain a loop of the body portion around the pivot joint when the support rod is received within the attachment aperture and the notched portion is received in the notch receiving portion.

4. The folding headrest assembly of claim 3, wherein the body portion has a first body portion disposed between the attachment aperture and the notched portion and a second body portion between the attachment aperture and the notch receiving portion.

5. The folding headrest assembly of claim 4, wherein the exposed portion of the pivot joint includes a first outer side that is aligned with the opening when the headrest is in the upright position and a second outer side that is aligned with the opening when the headrest is in the folded position, and wherein one of the first body portion and the second body portion are positioned between the first outer side of the pivot joint and the opening to obstruct view of the first outer side when the headrest is in the upright position, and wherein the other of the first body portion and second body portion is positioned between the second outer side of the pivot joint and the opening to obstruct view of second outer side when the headrest is in the folded position.

6. The folding headrest assembly of claim 3, wherein a width of the body portion is at least as great as a minimal width of the opening.

7. The folding headrest assembly of claim 1, wherein the exposed portion of the pivot joint includes a first outer side that is aligned with the opening when the headrest is in the upright position and a second outer side that is aligned with the opening when the headrest is in the folded position.

8. The folding headrest assembly of claim 7, wherein the first and second outer sides of the pivot joint are disposed on opposing sides of the support rod.

9. The folding headrest assembly of claim 1, wherein the headrest has a front surface defining a front portion of the opening and a bottom surface defining a bottom portion of the opening in communication with the front portion of the opening.

10. The folding headrest assembly of claim 9, wherein the pivot joint has a first outer side in alignment with the front portion of the opening with the headrest in the upright position and a second outer side in alignment with the bottom portion of the opening with the headrest in the folded position.

11. The folding headrest assembly of claim 10, wherein the closeout member comprises a body that circumscribes the pivot joint, the body having a first portion positioned between the first outer side of the pivot joint and the first portion of the opening with the headrest in the upright position to obstruct view of the first outer side, and a second portion positioned between the second outer side of the pivot joint and the second portion of the opening with the headrest in the folded position to obstruct view of the second outer side.

12. The folding headrest assembly of claim 1, further comprising:
   a second pivot joint in axial alignment with the first pivot joint and coupled to the frame for rotatably supporting the headrest with respect to the vehicle seat between the upright position and the folded position;
   a second support rod extending from the second pivot joint and configured for coupling to the vehicle seat, wherein when the headrest is fitted on the frame, the second pivot joint is positioned in a second opening defined in the headrest such that the second pivot joint has an exposed portion viewable through the second opening, the second opening configured to provide clearance for the second support rod as the headrest is rotated about the second pivot joint relative to the second support rod; and
   a second closeout member circumscribing at least the exposed portion of the second pivot joint that is aligned with the second opening of the headrest.

13. A vehicle seat, comprising:
   a seat back having a seating surface;
   a headrest having a frame;
   a pivot joint coupled to the frame for rotatably supporting the headrest atop the seat back from an upright position, wherein a bottom surface of the headrest is adjacent the seat back and front surface of the headrest is substantially aligned with the seating surface, to a folded position, wherein the headrest is rotated forward with respect to the seat back;
   a support rod extending from the pivot joint and coupled to the seat back, wherein when the headrest is fitted on the frame, the pivot joint is positioned in an opening defined in the headrest such that the pivot joint has an exposed portion viewable through the opening, the opening having a front portion defined by the front surface of the headrest and a bottom portion defined by the bottom surface of the headrest in communication with the front portion, the opening configured to provide clearance for the support rod as the headrest is rotated about the pivot joint from the upright position to the folded position; and a closeout member circumscribing at least the exposed portion of the pivot joint, the closeout member having an attachment aperture through which the support rod extends to position the closeout member proximate the exposed portion of the pivot joint in the opening to obstruct view of the exposed portion of the pivot joint.

14. The vehicle seat of claim 13, wherein the closeout member is a flexible elongate strip and is configured to fully circumscribe the pivot joint by forming a loop around the pivot joint when the support rod is extending through the attachment aperture.

15. The vehicle seat of claim 14, wherein the elongate strip comprises:
   a body portion configured to circumscribe the exposed portion of the pivot joint, with the attachment aperture positioned in the body portion;
   a notched portion; and
   a notch receiving portion, the notched portion and the notch receiving portion opposedly spaced from the attachment aperture and configured to create and retain a loop of the body portion around the pivot joint when the support rod is received within the attachment aperture and the notched portion is received in the notch receiving portion.

16. The vehicle seat of claim 13, wherein the exposed portion of the pivot joint includes a first outer side that is aligned with the opening when the headrest is in the upright position and a second outer side that is aligned with the opening when the headrest is in the folded position, the first outer side and second outer side opposedly disposed from each other.

17. The vehicle seat of claim 16, wherein the closeout member comprises a body that circumscribes the pivot joint, the body having a first portion positioned between the first outer side of the pivot joint and the first portion of the opening with the headrest in the upright position to obstruct view of the first outer side, and a second portion positioned between the second outer side of the pivot joint and the second portion of the opening with the headrest in the folded position to obstruct view of the second outer side.

18. The vehicle seat of claim 13, further comprising:
   a second pivot joint in axial alignment with the first pivot joint and coupled to the frame for rotatably supporting the headrest atop the seat back from the upright position to the folded position;
   a second support rod extending from the second pivot joint and coupled to the seat back, wherein when the headrest is fitted on the frame, the second pivot joint is positioned in a second opening defined in the headrest such that the second pivot joint has an exposed portion viewable through the second opening, the second opening having a front portion defined by the front surface of the headrest and a bottom portion in communication with the front portion defined by the bottom surface of the headrest, the second opening configured to provide clearance for the second support rod as the headrest is rotated about the second pivot joint from the upright position to the folded position; and
   a second closeout member circumscribing at least the exposed portion of the second pivot joint that is aligned with the second opening of the headrest.

19. A folding assembly for a vehicle interior, comprising:
   a first interior vehicle member rotatably coupled to a second interior vehicle member by a pivot joint positioned along a frame supporting the first interior vehicle member;
   a support rod extending from the pivot joint into the second interior vehicle member, wherein when the first interior vehicle member is positioned on the frame, the pivot joint is positioned in an opening defined in the first interior vehicle member such that the pivot joint has an exposed portion viewable through the opening, the opening configured to provide clearance for the support rod as the first interior vehicle member is rotated relative to the second interior vehicle member; and
   a closeout member forming a loop circumscribing at least the exposed portion of the pivot joint, the closeout member having an attachment aperture through which the support rod extends to position the closeout member proximate the exposed portion of the pivot joint in the opening to obstruct view of the exposed portion of the pivot joint.

20. The folding headrest assembly of claim 1, wherein the closeout member is an elongated material with the attachment aperture positioned at one end of the elongated material and a second attachment aperture positioned at another end of the elongated material, the support rod extending through both the attachment aperture and the second attachment aperture to position the closeout member in a loop about the pivot joint.

* * * * *